United States Patent [19]

Arp et al.

[11] 4,326,700
[45] Apr. 27, 1982

[54] DUAL FUEL BURNER FOR METAL MELTING FURNACES

[75] Inventors: David F. Arp, Carroll County, Ga.; Ronald L. Pariani, Escambia County, Fla.

[73] Assignee: Southware Company, Carrollton, Ga.

[21] Appl. No.: 173,790

[22] Filed: Jul. 30, 1980

[51] Int. Cl.³ .............................................. F27B 1/14
[52] U.S. Cl. .................................. 266/219; 266/900; 431/264; 431/284; 75/72
[58] Field of Search ................ 431/264, 284; 266/219, 266/900, 218; 75/72

[56] References Cited

U.S. PATENT DOCUMENTS 2,458,542  1/1949  Urquhart ............................ 431/284
4,154,571  5/1979  Pariani ............................... 431/186

Primary Examiner—M. J. Andrews
Attorney, Agent, or Firm—Herbert M. Hanegan; Stanley L. Tate; Robert Steven Linne

[57] ABSTRACT

Disclosed is an improved high velocity dual fuel burner and a method for firing a vertical shaft metal melting furnace with gaseous or liquid fuel in which the burner nozzle is adapted to mix and ignite both types of fuels alternately or in combination by means of three concentric nozzles including a central oil spraying nozzle, an intermediate nozzle to supply natural gas and an outermost nozzle to supply combustion air.

7 Claims, 3 Drawing Figures

DUAL FUEL BURNER FOR METAL MELTING FURNACES

BACKGROUND OF THE INVENTION

1. Field of the Invention

The present invention relates generally to burners for the combustion of fuel, and specifically to an improved high velocity dual fuel burner for optionally combusting gas or liquid fuel to fire a vertical shaft furnace for the continuous melting of metal pieces such as scrap copper.

2. Description of the Prior Art

In the prior art, there are many types of vertical furnace arrangements that have been used for melting various types of charge materials under a wide variety of different circumstances, such as the typical units disclosed in U.S. Pat. Nos. 2,203,163; 2,815,278; 2,886,304; 3,148,973; 3,199,977; 3,603,571; and 3,958,919. U.S. Pat. Nos. 3,715,203; 3,788,623; and 3,809,378 generally disclose specific types of furnace arrangements that are particularly useful in melting non-ferrous metals.

Modern industrial heating processes and especially metal melting furnaces require burners which have a number of preferred characteristics. Burners may generally be classified into three types, depending on the method of mixing the fuel and air.

The simplest arrangement, often called a throat-mix burner, consists of admitting the fuel and air into the combustion chamber through separate ports, usually adjacent to each other, and allowing the two to mix and burn in the furnace. This method of burning gives large, relatively slow-moving flames and has been widely used in firing open hearth steel furnaces.

A second type of mixing is found in the inspirator type of burner wherein the fuel is delivered to the burner under pressure and is discharged from a nozzle or jet in such a way that its momentum is used in mixing the fuel with indrawn air.

The third type of burner involves premixing all or part of the air with a gaseous fuel prior to delivery to the burner. With this arrangement the burner itself may be a relatively simple nozzle designed to deliver the combustible mixture without backfire or flame blowoff. A variety of arrangements are used for premixing and are well known in the art.

Within the prior art directed towards burners and their specific structural configurations, many varying types of burners have been designed to operate under a wide variety of particular applications and environments or for use in heating a material charge having various individual characteristics. Such burners include those as disclosed in U.S. Pat. Nos. 2,605,180; 3,701,517; 3,852,021; and 4,154,571.

Due to recent price increases and the widespread nonavailability of the cleaner gaseous fuels such as natural gas or propane or the like, it has become desirable to be able to burn various grades of fuel oils with such burners to provide the appropriate heating necessary for heating and melting a material charge within a furnace. Many attempts have been made at providing an effective liquid fuel burner such as those disclosed in U.S. Pat. Nos. 2,632,501; 2,697,910; 2,698,050; 2,711,214; 3,366,469; 2,205,983; 2,333,531; 2,632,300; 2,725,929; 3,042,105; 3,558,119; 3,749,548; 3,758,263; 3,777,983; 3,947,226; 3,980,415; 3,986,815; and, 4,025,282 and in U.S. patent application Ser. No. 921,039.

There are economic and logistic advantages and disadvantages in using either gas or liquid fuel systems. Natural gas fuel is normally less expensive than liquid fuel, but is available in sufficient supply, of at all, only seasonally. Gas fuel is also difficult to store at the site unless stored in liquid form such as liquified propane or butane or the like. Liquid fuel is usually more expensive but is also more available than gas fuel and easy to store as a reserve fuel supply. For these reasons, ability to optionally use gas and or liquid fuel would be highly advantageous, particularly in continuous industrial operations. This use of alternate fuels is possible under the prior art only by duplication of the separate types of burner systems including burners, manifolds and controls. However, duplication is expensive, inefficient and usually reduces the accuracy or ease of combustion control. The present invention provides the ability to optionally use gas and/or liquid fuel without system duplication by means of a novel burner design.

SUMMARY OF THE INVENTION

The present invention is an improved high velocity dual fuel burner and a method for firing a vertical shaft melting furnace with gas or liquid fuels in which the burner nozzle is adapted to efficiently mix and ignite both types of fuels alternately or in combination.

The method aspects of the present invention are manifested in a process for melting metal in a furnace which can be fired with any type of fuel such as natural gas, propane, butane, naptha, gasoline, fuel oil or the like. When liquid fuel is to be used, it is directed to the desired ignition point, such as a combustion chamber in the wall of a furnace, where it is vaporized and ignited by a pilot flame to fire the furnace, while an independent air supply means provides the large volume of oxygen containing air required for combustion. To convert from liquid fuel to gas fuel during continuous operation without interrupting the melting process, the amount of liquid fuel supplied to the ignition point is decreased as an increasing amount of gas fuel is premixed with the combustion air and supplied to the burner by the independent air supply means.

A continuous pilot flame is preferably supplied by combusting an air and gas mixture which is then used to continuously ignite the selected primary fuel. During partial converted mode both gaseous and liquid fuels may be used to fire the furnace, and when conversion is completed the system burns only gaseous fuel. To return to use of liquid fuel the process is simply reversed, all without interruption of the melting process.

The burners are preferably banked in sets of 3 to 6 which are supplied from common fuel and air regulation devices to reduce the complexity of the system and to promote more balanced firing whenever a large number of burners are used in a furnace.

Premix gas operation allows for a very accruate and reliable method of fuel ratio analysis and control not possible with a nozzle mix type of gas burner. The prefered method involves drawing off a sample of the premixed fuel gases prior to combustion, burning the gas remotely under controlled conditions, then analyzing the products of the controlled combustion to determine the percentage of carbon monoxide which is directly related to the composition of the fuel gas.

In addition, this invention is quieter than conventional nozzle mix burners resulting in significant reduction in the noise usually associated with vertical shaft melting furnaces.

Thus a major object of this invention is to provide a high velocity dual fuel burner for firing a vertical shaft melting furnace with gas or liquid fuels alterately or in combination.

Another object of this invention is to provide a high velocity dual fuel burner for firing a vertical shaft melting furnace with gas or liquid fuels which is adapted to change from one fuel to the other during continuous operation without interrupting the melting process.

Another object of the present invention is to provide a high velocity dual fuel burner for firing a vertical shaft melting furnace which requires less individualized control as a result of being banked with other burners and supplied from common fuel and air regulation devices.

Still another object of this invention is to provide a high velocity dual fuel burner for firing a vertical shaft melting furnace with gas or liquid fuels which is quieter than conventional nozzle mix burners.

BRIEF DESCRIPTION OF THE DRAWINGS

While the specification concludes with claims particularly pointing out and distinctly claiming the subject matter which is regarded as the invention, it is belived that the invention, objects, features and advantages thereof will be better understood from the following description taken in connection with accompanied drawings in which like parts are given like identification numerals and wherein:

DESCRIPTION OF THE PREFERRED EMBODIMENT

Figure 1:
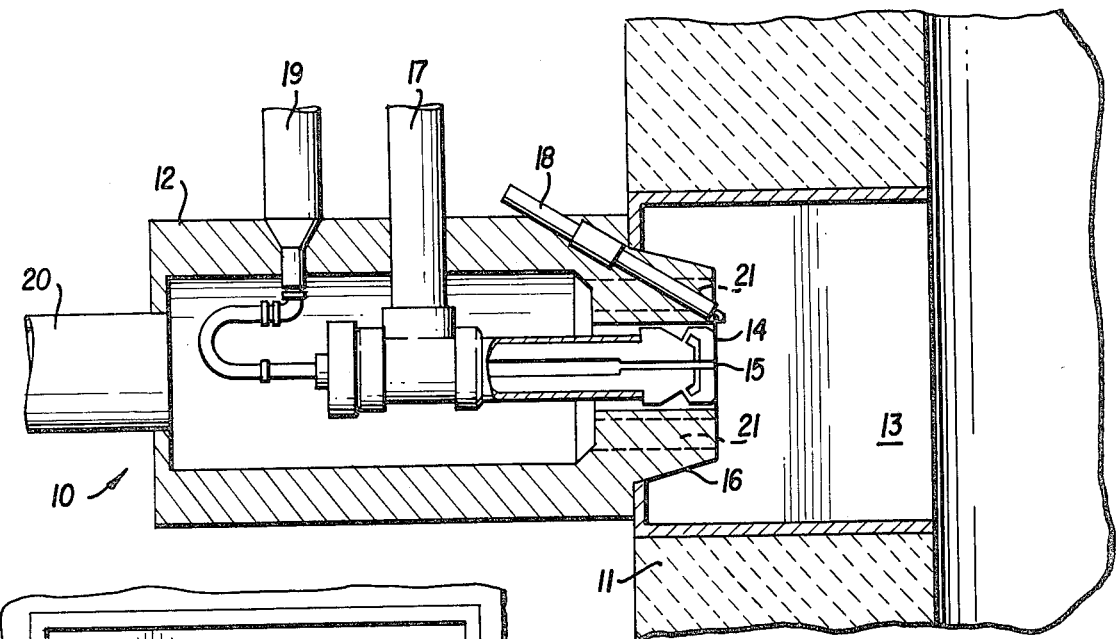
FIG. 1 is a sectional view of the preferred embodiment of the present invention as mounted on a vertical shaft melting furnace.

As FIG. 1 illustrates, the improved high velocity dual fuel burner assembly 10 is mounted in a conventional manner to the wall of a vertical shaft melting furnace 11 adapted for melting metal pieces therein. The two major components of the burner 10 are the cylindrical burner housing 12 and the combustion chamber 13. Between the cylindrical burner housing 12 and the combustion chamber 13 is a series of concentric nozzles including a pilot fuel nozzle 14 which surrounds a liquid fuel nozzle 15 and is itself surrounded by a combination combustion air and/or premixed gas and air nozzle 16.

Pilot fuel, generally premixed gas and air, is supplied to the pilot fuel nozzle 14 by pilot fuel supply pipe 17 and is initially ignited by a spark plug or similar device 18. The pilot fuel nozzle 14 includes a multiplicity of symetrically spaced ports 22 (shown in FIG. 2) which direct the pilot fuel into a generally uniform pattern within the combustion chamber 13 in order to promote efficient ignition. The pilot fuel is preferably continuously supplied to the pilot fuel nozzel 14 through the main pilot supply pipe during operation to ensure constant combustion of the main fuel whether gas, liquid or a combination thereof. The pilot fuel is preferrably premixed gas and air but could be any type of easily ignitable fuel.

When liquid fuel has been selected to fire the furnace 11, the liquid fuel is supplied under pressure to the liquid fuel nozzle 15 by a liquid fuel supply pipe 19. The liquid fuel nozzle 15 is the centralmost of the three generally concentric nozzles 14, 15 and 16 and is also concentric with the cylindrical combustion chamber 13 to promote uniform combustion of the liquid fuel in the combustion chamber 13. A high volume of combustion air, for use in combustion of the liquid fuel, is supplied by a combination combustion air or premixed gas and air supply pipe 20. The combustion air passes through the burner housing 12, through the combination combustion air or premixed gas and air nozzle 16 and into the combustion chamber 13 where it is mixed with the fuel.

The combination nozzle 16 is in the outwardmost of the three concentric nozzles 14, 15 and 16 and comprises a multiplicity of symetrically located passageways 21 to permit high velocity and high volume flow into the combustion chamber 13.

The liquid fuel nozzle 15 is a spray type nozzle which, in combination with the high velocity pilot burner fluid stream, vaporizes a high volume of liquid fuel into the path of the combustion air where it is continuously ignited by the burning pilot fuel. Concentric alignment of the liquid fuel nozzle 15 and the combination nozzle 16 with the cylindrical combustion chamber 13 plus symetrical introduction of combustion air into the combustion chamber 13 by the passageways 21 of the combination nozzle 16 promote uniformly complete combustion of the liquid fuel. The liquid fuel is preferably a low sulfur containing fuel since it is desirable to prevent sulfur contamination of the metal within the furnace 11.

To change from liquid fuel to gas fuel without substantial interruption of the melting process, a premixed gas and air fuel gradually and increasingly replaces the combustion air as the substance supplied to the combustion chamber 13 by the combination combustion air and premixed gas and air supply pipe 20 while the quantities of liquid fuel supplied to the liquid fuel nozzle 15 decreases to a halt. Once the conversion is complete, the premixed gas and air fuel passes through the passageways 21 of the combination nozzle 16 into the combustion chamber 13 in a substantially symetrical pattern where it is continuously ignited by the burning pilot fuel to promote uniformly complete combustion of the premixed gas and air fuel.

To convert back to liquid fuel this process is simply reversed. The conversion may be only partial if desired to allow firing the furnace 11 with liquid fuel and gas fuel at the same time.

Since the three nozzles 14, 15 and 16 are concentric with each other and with the combustion chamber 13, portions of the supply pipes 17, 19 and 20 should be concentric with the longitudinal axis of the cylindrical combustion chamber. The interior of the burner housing 12 may be an extension of the combination combustion air and premixed gas and air supply pipe 20 and is concentric with the longitudinal axis of the combustion chamber 13. Inside of and concentric with the burner housing 12 is a portion of the pilot fuel supply pipe 17 which connects to the pilot fuel nozzle 14. Inside of and concentric with that portion of the pilot fuel supply pipe 17 is the portion of the liquid fuel supply pipe 19 which leads to the liquid fuel nozzle 15.

Figure 2:
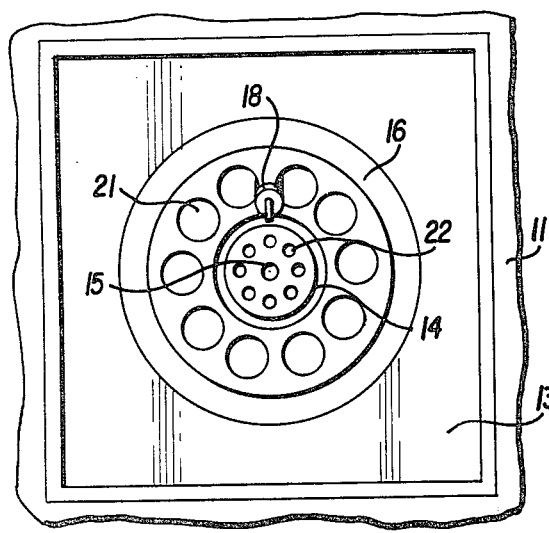
FIG. 2 is an end view of the preferred embodiment of the present invention as seen from inside a vertical shaft melting furnace.

FIG. 2 is a view of the burner 10 and the combustion chamber 13 from within the furnace 11. This view clearly illustrates the desired concentricity of the combustion chamber 13 and the three nozzles 14, 15 and 16 and the symetry of the pilot fuel nozzle ports 22 and the combination nozzle passageways 21 which combine to ensure uniformly complete combustion.

An unexpected advantage of this improved high velocity dual fuel burner 10 is that it is generally much quieter than conventional nozzle mix burners used in the prior art.

Figure 3:
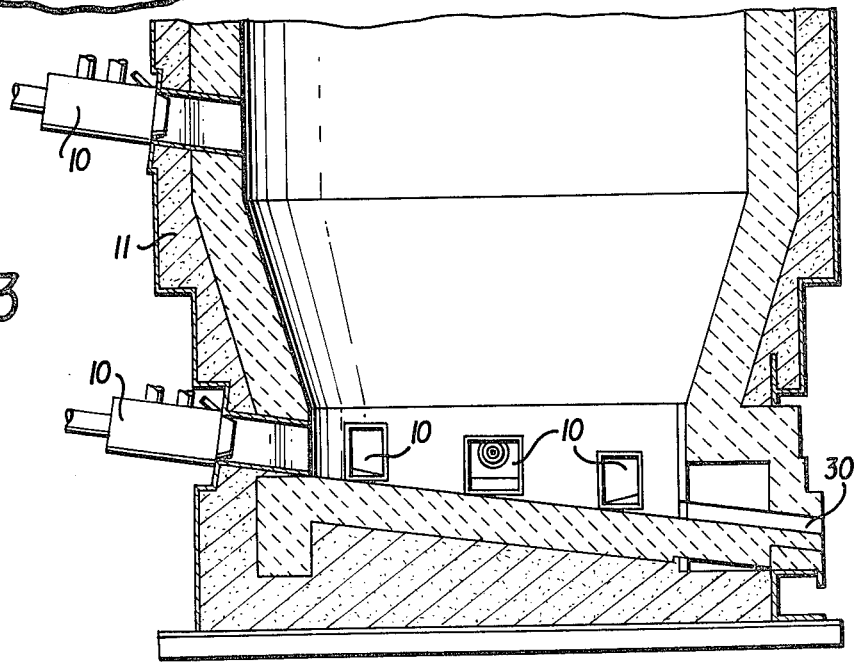
FIG. 3 is a sectional view of the lower portion of a conventional vertical shaft melting furnace adapted for use with the present invention.

FIG. 3 illustrates the lower portion of a furnace 11 adapted for use with the improved high velocity dual fuel burners 10. Metal which is to be melted in this furnace 11, copper pieces for example, is charged into the top of the furnace (not shown) and descends to the bottom of the furnace 11 as it is continuously melted by the high velocity dual fuel burners 10 and exits the furnace 11 through a tapping outlet 30 for further processing.

The burners 10 are grouped or banked in control groups comprising about three to six burners and are supplied from common fuel and air sources (not shown) to enable uniformity of the combustion process by reducing the complexity of the air and fuel mixing apparatus. Control and distribution of the fuel may be provided by a system (not shown) such as the one disclosed in U.S. Pat. No. 4,211,555.

While this invention has been described in detail with particular reference to a preferred embodiment thereof, it will be understood that the variations and modifications can be effective within the spirit and scope of the invention as described hereinbefore and as defined in the appended claims.

What is claimed is:

1. An improved dual fuel burner assembly for firing a vertical shaft metal melting furnace with a fuel selected from the group consisting of gaseous and liquid fuel and combinations thereof, of the type having a combustion chamber adapted to be mounted within the wall of said furnace; a burner housing sealingly mounted to said chamber and serving as means for introducing combustion air thereto; means for continuously introducing fuel to said chamber; and a means within said chamber for igniting the fuel and air,
wherein the improvement comprises two of said means for continuously introducing fuel which further comprises: a first means which is a liquid fuel supply pipe terminating in and communicating with a liquid fuel spraying nozzle, which is contained within and surrounded by a second means; said second means is a premixed gas-and-air supply pipe terminating in and communicating with a premixed gas-and-air nozzle, which is contained within and surrounded by the burner housing which serves as a combustion air supply means, which means communicates with a combustion air nozzle; and wherein each of said means for introducing liquid fuel, combustion air, and premixed gas-and-air are co-axial with, and extend to the same point within, said combustion chamber so that all of said nozzles lie in a single plane perpendicular to the axis of the combustion chamber.

2. The apparatus of claim 1 wherein said liquid fuel nozzle is adjacent to said combustion chamber, is concentric to the longitudinal axis of said combustion chamber, and is adapted to vaporize liquid fuel into said combustion chamber in a substantially uniform pattern to promote complete combustion of liquid fuel therein.

3. The apparatus of claim 1 wherein said combustion air nozzle and said premixed gas-and-air nozzle are adjacent to said combustion chamber, are concentric with and surround said liquid fuel nozzle, and each comprises a multiplicity of symetrically spaced combustion air or premixed gas-and-air passageways adapted to permit high velocity and high volume flow into said combustion chamber in a uniform manner to promote complete combustion of the selected fuel.

4. An improved vertical shaft metal melting furnace of the type having a multiplicity of burner assemblies for combining and combusting gaseous fuel and air, each of said burner assemblies sealingly mounted to a combustion chamber formed in, and communicating through, the wall of said furnace; and each having a generally cylindrical burner housing, co-axial with and extending to a point within said chamber, for directing combustion air into said chamber,
wherein the improvement comprises:
a first means for continuously introducing a combustible gaseous fuel mixture to the combustion chamber, said means contained within and surrounded by the burner housing and extending to the same point within the combustion chamber to which said housing extends so that the gaseous fuel mixture is combined with the combustion air at that point;
and a second means for introducing liquid fuel into said combustion chamber at the point where gaseous fuel and air are combined, said second means contained within and surrounded by the aforesaid first means; and wherein either of said means for introducing said gaseous fuel and said liquid fuel may be utilized so that any amount of either fuel may be selected for combustion without modifying the burner assemblies.

5. The apparatus of claim 4 wherein each of said burner assemblies are banked together with from 3 to 6 other burners.

6. The apparatus of claim 4 wherein said first means, for introducing gaseous fuel to the combustion chamber, and said second means, for introducing liquid fuel into the combustion chamber, are adapted to be used alternately and in combination so as to change from one fuel to the other without interruption of the melting process.

7. The apparatus of claim 4 wherein said burner housing and said first means for introducing a gaseous fuel mixture both communicate with the combustion chamber through a multiplicity of symetrically spaced ports arranged around said second means for introducing liquid fuel so that a uniform flame may be maintained in the combustion chamber when changing from one fuel to the other.

* * * * *